United States Patent
Moore et al.

(10) Patent No.: US 8,107,135 B2
(45) Date of Patent: Jan. 31, 2012

(54) MOTORIZED DOCUMENT SCANNER

(75) Inventors: Michael J. Moore, Beverly Hills, MI (US); John Gudenburr, Canton, MI (US); Sammy C. Hutson, Novi, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 845 days.

(21) Appl. No.: 12/145,571

(22) Filed: Jun. 25, 2008

(65) Prior Publication Data

US 2009/0323140 A1 Dec. 31, 2009

(51) Int. Cl.
 *H04N 1/04* (2006.01)
 *G06K 7/08* (2006.01)
 *G06K 9/20* (2006.01)

(52) U.S. Cl. ........ 358/474; 358/497; 358/494; 358/483; 358/408; 358/442; 382/312; 382/318; 382/320

(58) Field of Classification Search .................. 358/474, 358/442, 497, 494, 505, 483, 472, 408; 382/320, 382/312, 313, 318; 235/454
See application file for complete search history.

(56) References Cited

U.S. PATENT DOCUMENTS

| | | | | |
|---|---|---|---|---|
| 4,893,196 A * | 1/1990 | Koshiyouji et al. | ........... | 358/474 |
| 6,072,602 A * | 6/2000 | Sun et al. | ........... | 358/497 |
| 6,388,778 B1 * | 5/2002 | Ko-Chien | ........... | 358/497 |
| 6,721,072 B1 * | 4/2004 | Tsai et al. | ........... | 358/471 |
| 7,469,824 B1 * | 12/2008 | Crews et al. | ........... | 235/379 |
| 2007/0154241 A1 * | 7/2007 | Maruno | ........... | 399/211 |

FOREIGN PATENT DOCUMENTS

JP 2002244230 A * 8/2002

* cited by examiner

*Primary Examiner* — Cheukfan Lee (74) *Attorney, Agent, or Firm* — Honigman Miller Schwartz and Cohn LLP (57) ABSTRACT

A document scanner, such as a check scanner, is disclosed. The document scanner includes a document bed having a document positioning surface, the document positioning surface arranged to receive a document placed thereon. The document scanner further includes a scanning module slidably movable across the document positioning surface, the scanning module including one or more data capture devices arranged to contact a document during a scanning process. The document scanner also includes a motor operatively connected to the scanning module, the motor configured to move the scanning module across the document positioning surface during the scanning process.

16 Claims, 6 Drawing Sheets

MOTORIZED DOCUMENT SCANNER

TECHNICAL FIELD

The present disclosure relates to a scanning system. More specifically, the present disclosure relates to a motorized document scanner, such as a check scanning device.

BACKGROUND

Electronic document reading and imaging systems are commonly employed in situations that require cost-effective and efficient methods to record and process document information. For example, this technology is utilized by various commercial services and business industries who have found it advantageous to electronically scan and read relevant check information using on-site document scanning devices. One benefit of this approach relates to an inherent expedited check processing ability, because the check information is immediately available. Specifically, as a result of the Check Clearing for the 21$^{st}$ Century Act (commonly referred to as Check 21 legislation) the need to physically transport the check to a specialized check processing facility is eliminated, thereby avoiding the substantial delays and losses necessarily incurred by check transportation and handling.

Check scanning methods used by the aforementioned industries typically employ a distributed capture environment that involves mechanically handling a check via a distributed system of drive tracks, pinch rollers and/or belts to position and present the check to a static scanning module. The scanning module includes one or more functional elements configured to acquire relevant document data, such as image and account routing information, of the check during a scanning procedure. In general, the maintenance associated with such a distributed system is expensive in terms of mechanical support. For example, the various gears, aligners, belts, bearings and sensors require constant maintenance to keep the system running smoothly. Additionally, fundamental logistical issues such as check jamming or induced check damage are virtually unavoidable as a result of the movement of the checks through a system of moving parts. Further, the distributed capture environment is generally not a viable document scanning solution for small scale end users who require low-cost portable document scanning technologies.

For these and other reasons, improvements are desirable.

SUMMARY

In accordance with the present disclosure, the above and other problems are solved by the following:

In a first aspect, a document scanner is disclosed. The document scanner includes a document bed having a document positioning surface, the document positioning surface arranged to receive a document placed thereon. The document scanner further includes a scanning module slidably movable across the document positioning surface, the scanning module including one or more data capture devices arranged to contact a document during a scanning process. The document scanner also includes a motor operatively connected to the scanning module, the motor configured to move the scanning module across the document positioning surface during the scanning process.

In a second aspect, a method of capturing information from a document using a document scanner is disclosed. The method includes receiving a document on a document positioning surface of a document bed. The method further includes initiating a scanning procedure via an application run on a personal computer. The method also includes scanning at least a portion of the document by moving a scanning module across the surface of the document to capture information from the document, the scanning module including one or more data capture devices arranged to contact a document. The method further includes processing the scanned document information.

In a third aspect, a check scanner is disclosed. The check scanner includes a document bed having a check positioning surface sized to receive a personal check. The check scanner also includes a scanning module slidably attached to the document bed, the scanning module including one or more data capture devices arranged to contact a check during a check scanning process, the one or more data capture devices including a contact image sensor and a magnetic character reader. The check scanner further includes a stepper motor affixed to the document bed; wherein the stepper motor is connected to the scanning module via a belt and pulley system, and wherein the stepper motor is configured to actuate the scanning module to pass over a check positioned on the document positioning surface during a scanning procedure.

DETAILED DESCRIPTION

Various embodiments of the present disclosure will be described in detail with reference to the drawings, wherein like reference numerals represent like parts and assemblies throughout the several views. Reference to various embodiments does not limit the scope of the disclosure, which is limited only by the scope of the claims attached hereto. Additionally, any examples set forth in this specification are not intended to be limiting, on the contrary, the examples merely set forth some of the many possible embodiments for the claimed invention.

In general, the present disclosure relates to a document scanner. More specifically, the present disclosure relates to a document scanner, particularly a portable document scanner, including a motorized scanning module. The document scanner can be, for example, a check scanning device, in which contact between a scanning device and the document being scanned is required. Document scanners, also referred to herein as document readers, demonstrate a simple and cost-effective methodology for capturing relevant document information, in accordance with the principles of the present disclosure.

Figure 1:
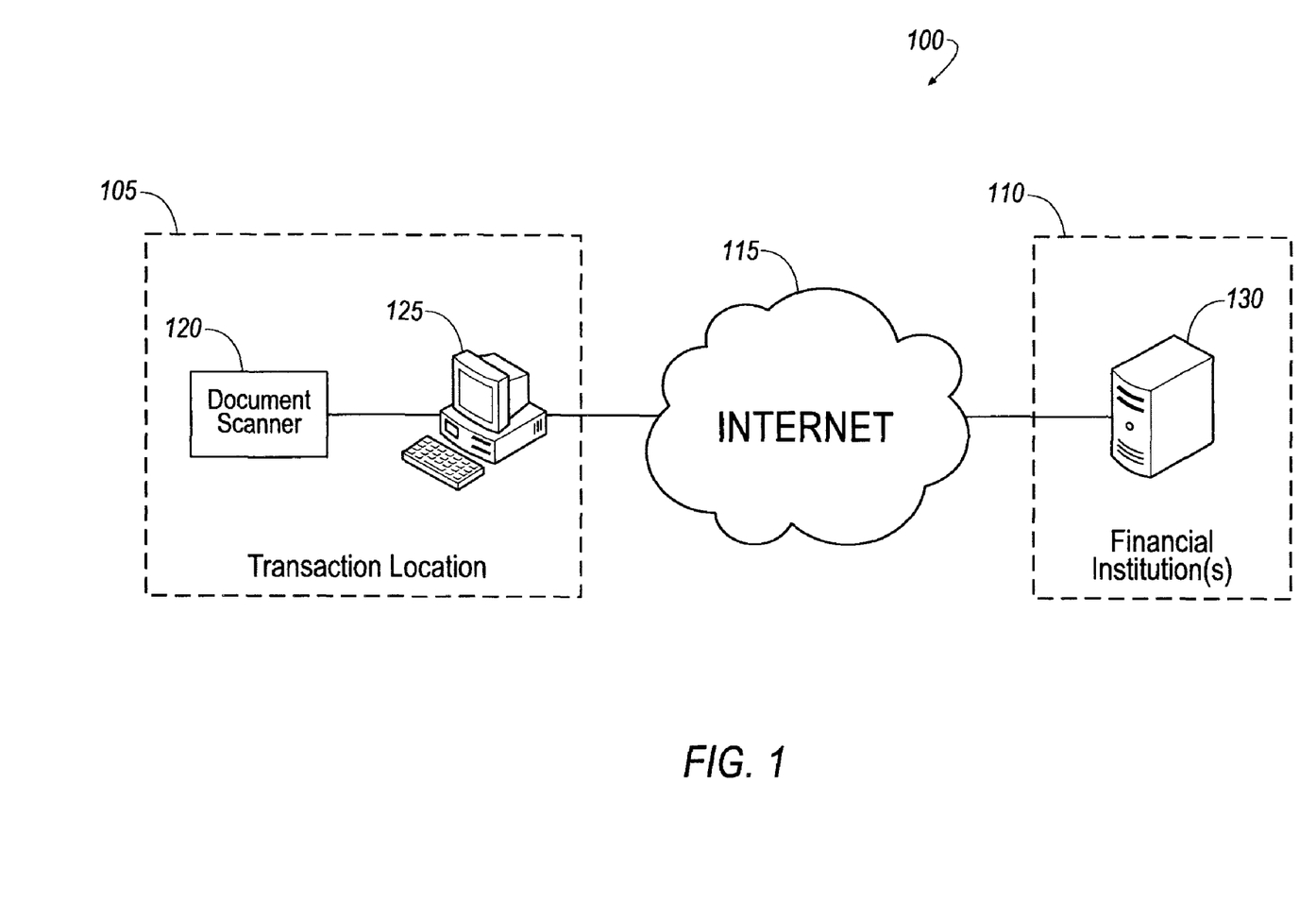
FIG. 1 is a schematic depiction of a network in which a document scanner having features in accordance with the present disclosure can be utilized.

Now referring to FIG. 1, an example network 100 is shown incorporating a document reader having features consistent with principles of the present disclosure. By document reader or document scanner, it is intended that any of a number of types of document scanning devices are incorporated which can capture image or text data of a printed document for electronic storage and transmission. The network 100 is an example location for a motorized document scanner, in accordance with the various embodiments of the present disclosure. The network 100 generally includes one or more transaction locations 105 and financial institutions 110, communicatively connected via a communication network, shown in the example embodiment as an internet connection 115.

A transaction location 105 may be any location at which a financial transaction may take place, such as for purchase or sale of goods and services. Example transaction locations may include home businesses, schools, churches or commercial locations such as restaurants, supermarkets, or virtually any location where an on-site document scanner 120 may be desirable. In this fashion, each transaction location includes a document scanner 120 interconnected with a computing system 125. The document scanner 120 is arranged to provide the transaction location 105 with the ability to electronically acquire information about a printed document used for payment in exchange for goods and/or services. In certain embodiments, the document scanner 120 can be a check scanner, which is sized and designed appropriately to read financial account information on personal checks and scan images of one or both sides of the check. In other alternative embodiments, the document scanner 120 can scan and/or read documents of various dimensions, configurations and types. For example, documents such as credit cards, state driving licenses, national passports and business cards or receipts may be scanned by the document scanner 120.

The computing system 125 can be any of a number of types of computing systems, such as a general purpose computing system, or a specialized computing system such as a cash register or inventory system. The computing system 125 can interconnect with the document scanner 120 by any of a number of standard or specialized communication interfaces, such as a USB, 802.11 a/b/g network, RF, infrared, serial, or any other data connection. In certain embodiments, the computing system 125 runs an application configured to control the document scanner 120 such that the computing system 125 may receive data from the document scanner 120. The acquired data (images, text, or other information) may then be stored in a memory element and/or sent via a communication network to other compatible systems that may be local or remote such as a financial institution 110, as described further below.

In the example network shown, the financial institution 110 generally includes a computing system 130 configured to receive electronic records of financial transactions. The computing system 130 can be any of a number of types of computing systems capable of storing and managing financial transactions. For example, in the embodiment shown the computing system 130 is a server system comprising one or more discrete computing units interconnected, as is known in the art.

The electronic records in the network 100 can be electronic transaction records, and can include scanned copies of documents relating to financial transactions. In accordance with the example network 100 shown, an electronic record can reflect a transaction involving a check. In general, the electronic record includes, the routing and institution number printed on the front side of the check. Additionally, the electronic record may include an image of one or more sides of the check used as validation and/or to display relevant check endorsements. It will be appreciated that many other electronically captured transactions may be tracked using the network 100 as well. For example, credit card transactions, contracts, or other negotiable instrument transactions may be tracked using the network 100.

The internet connection 115 depicted can be any of a number of secure WAN, LAN, or other packet based communication networks such that data can be shared among a number of computing systems or other networked devices. Furthermore, although in the embodiment shown illustrates two computing devices 125, 130 at different, specific locations, the computing devices and/or the document scanner 120 may be located at the same location or within the same network.

Figure 2:
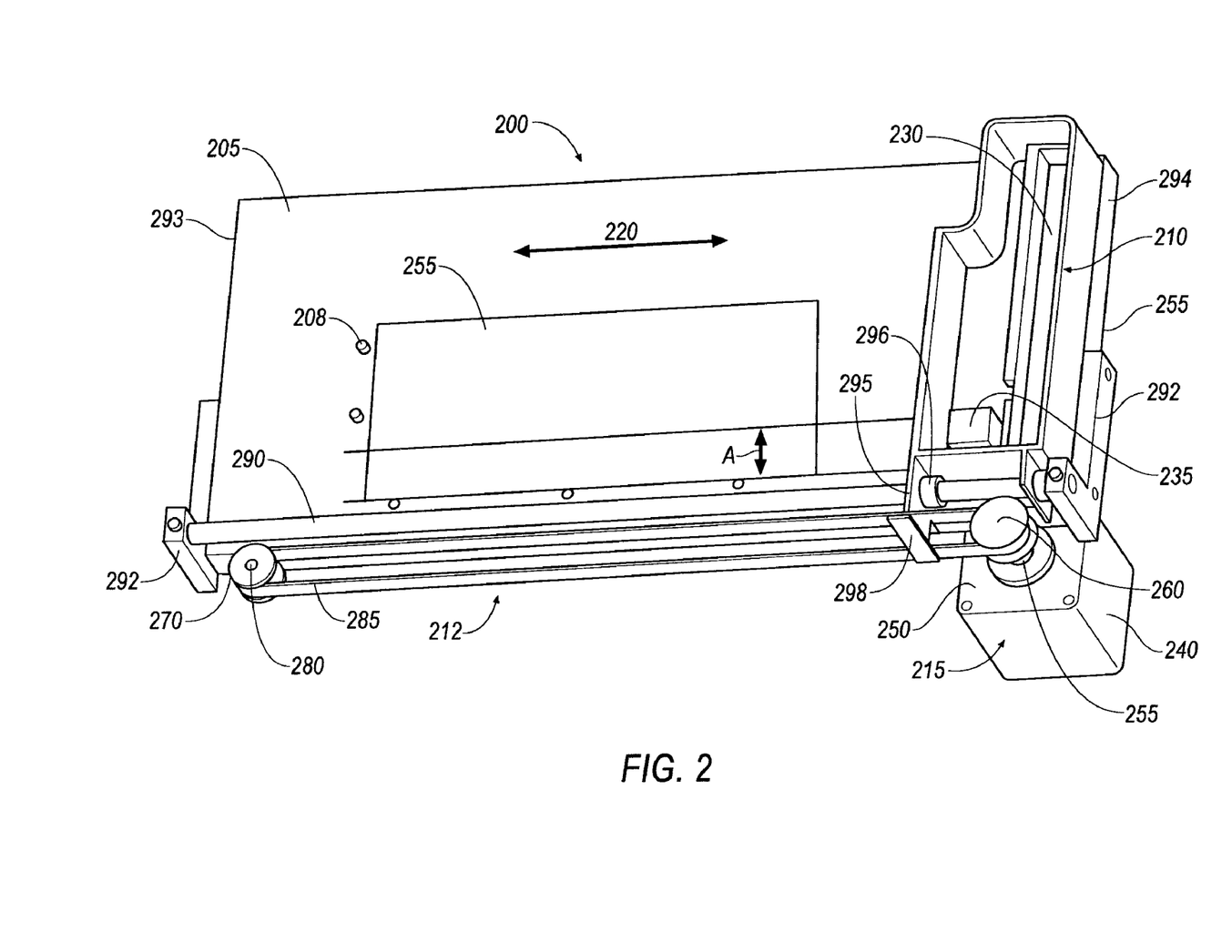
FIG. 2 is a perspective view of a document scanner according to a possible embodiment of the present disclosure.
Figure 3:
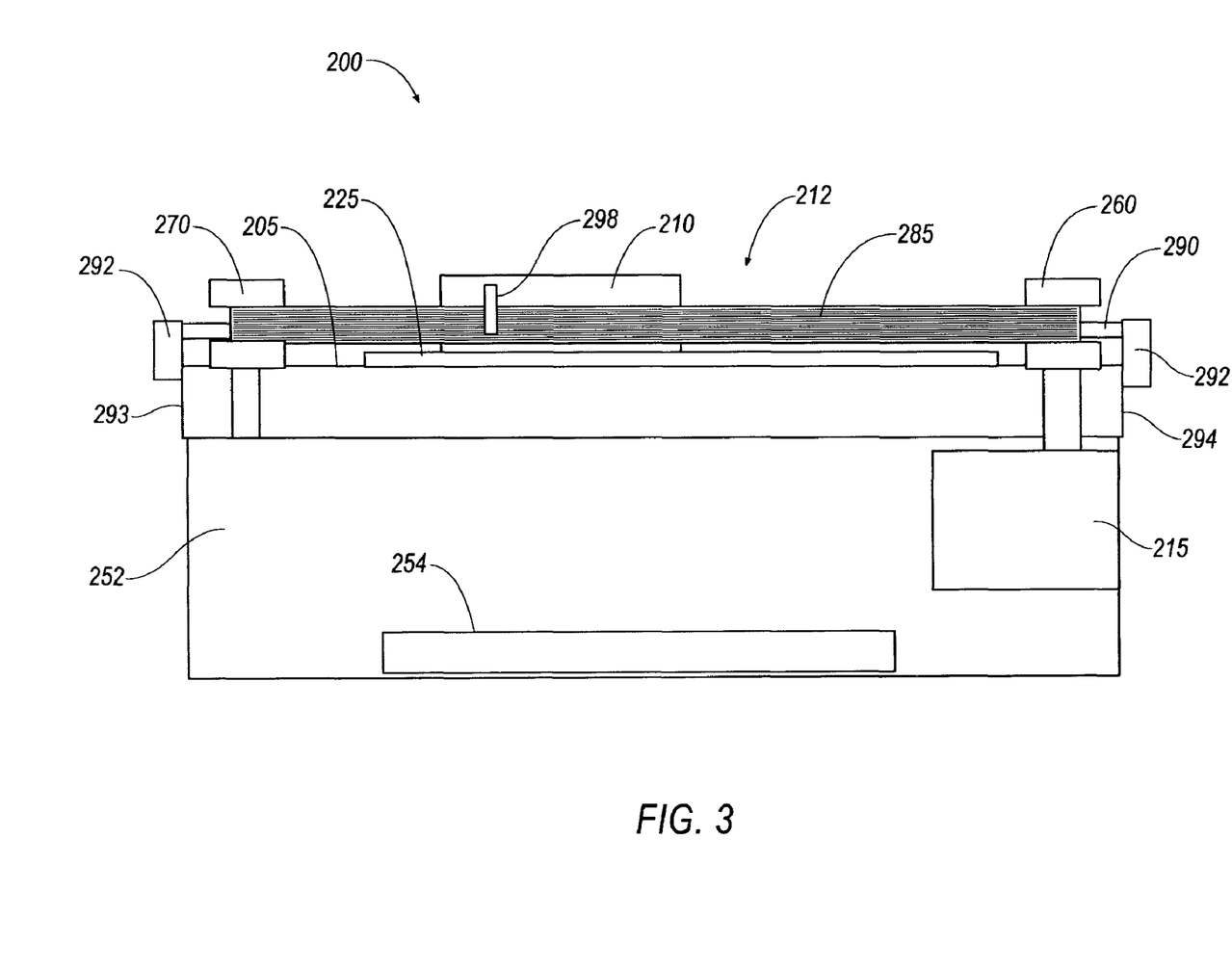
FIG. 3 is a side view of the document scanner of FIG. 2.

Referring to FIG. 2 and FIG. 3, a document scanner 200 is shown according to a possible embodiment of the present disclosure. In certain embodiments, the document scanner 200 can be incorporated into a network such as network 100 of FIG. 1. In general, the document scanner 200 is a system which can be used to obtain image and/or embedded character information of a document during a scanning procedure. In the example embodiment, the document scanner 200 is a check scanning device and includes a document bed 205, a scanning module 210 and a stepper motor 215. In general, the stepper motor 215 is coupled to the scanning module 210 such that the scanning module 210 is movable according to an approximately constant speed profile. When the stepper motor 215 is activated to start a scanning process the scanning module 210 is actuated in a direction of motion 220, as described further below. When the scanning process is complete, the stepper motor 215 can optionally return the scanning module 210.

The document bed 205 may be made from a high-friction material, such as a rubber or high-friction plastic material which assists in maintaining the position of a check or other document in contact with the document bed 205. The document bed 205 optionally includes one or more registration assemblies 208 arranged to at least partially frame a document positioning surface 225. In the example embodiment, the plurality of registration assemblies, and equivalently the document positioning surface 225, are specifically configured and sized to receive a check. However, the document bed 205, the plurality of registration assemblies 208 and/or the document positioning surface 225 can be sized or shaped such that any number of different types of documents having different dimensions can be scanned. Further details of a document scanner having one or more registration assemblies are described in U.S. patent application Ser. No. 12/145,743 filed on Jun. 25, 2008 and entitled "Document Reader Having a Document Registration and Retention System," the disclosure of which is hereby incorporated by reference in its entirety.

In an example embodiment, the scanning module 210 is preferably at least the same width as the document bed 205 and is configured to pass over a document placed on the document positioning surface 225 during the scanning procedure. The scanning module 210 can include one or more integral scanning elements designed to capture information about the document during the scanning procedure.

In the embodiment shown, the scanning module 210 includes a contact image sensor (CIS) module 230, and a magnetic ink character recognition (MICR) module 235. In general, the CIS module 230 includes a linear scan element used to acquire image data of a document placed on the document positioning surface 225 during the scanning procedure. In the embodiment shown, the CIS module 230 is arranged to pass within 0.010 inches of the check during the scanning procedure. In certain embodiments of use in which the CIS module 230 is moved across a document at a reliable, known rate, a scanner speed profile (the rate the scanning module 210 moves over the document during the scanning procedure) can used in an algorithm to transform the data gathered by the CIS module 230 into an image using known image resolution parameters.

The MICR module 235 interprets magnetic features representing alphanumeric characters printed on and/or embedded in a document. As the scanning module 210 moves along the length of the document positioning surface 225 during the scanning procedure, the MICR module 235 describes a path having a cross-sectional dimension, A, across the check to read magnetic characters representing account and routing information. The MICR module 235 is positioned to be in full contact with a check during the scanning procedure.

In the case of the CIS module 230 and the MICR module 235, the CIS module 230 has a speed above which captured image quality declines to the point where images are unusable; likewise, the MICR module 230 has a speed below which captured character information is unreliable and error-prone. Therefore, there preferably exists a range of speeds which are sufficiently slow to allow accurate image capture by the CIS module 230 and sufficiently fast to allow accurate character capture by the MICR module 235. Furthermore, knowledge of the scanner speed profile is used to accurately interpret images captured by the CIS module 230 and magnetic character signatures captured by the MICR module 235. Therefore, a known speed of travel of the scanning module 210 is desired.

In addition to the document bed 205 and the scanning module 210 a stepper motor 215 is included in the document scanner 200. The stepper motor 215 is configured to be connected to the scanning module 210 such that during the scanning procedure the stepper motor moves the scanning module 210 across the document positioning surface. In certain embodiments, the stepper motor 215 moves the scanning module at a constant scanner speed profile, thereby enabling the MICR 235 and the CIS module 230 to acquire a reliable set of image and character data during the scanning procedure.

The stepper motor 215 is mechanically coupled to the scanning module 210 via a belt and pulley system 212 mounted to the document scanner 200. Features integral to the scanning module 210 directly link to the belt and pulley system 212 so that the stepper motor 215 may actuate movement of the scanning module 210 during the scanning procedure.

In one example embodiment, the stepper motor 215 and the belt and pulley system 212 include several features. For example, the stepper motor 215 includes an electric motor (not shown) housed in a protective casing 240. The protective casing 240 serves to protect the electric motor from damage and contamination from the immediate environment around the electric motor and also to provide a surface with which to mount the stepper motor 215 to the document scanner 200. The stepper motor 215 is positioned along a first side of the document scanner 200 such that a portion of a top side 250 of the protective casing 240 is affixed to an underside 255 of the document bed 205. It will be appreciated that there are many possible methods and configurations that the stepper motor 215 can be mounted to the document bed 205. For example, the protective casing 240 can be removably mounted to the document bed 205 via a screw and bolt assembly or the like. In alternative embodiments, the protective casing 240 can be mounted to the document bed 205 via a weld or other permanent mounting techniques. In another alternative embodiment, the stepper motor 215 may housed in an enclosure 252 integrally formed with the document scanner 200 as depicted in FIG. 3.

Protruding through the top side 250 of the protective casing 240 is a shaft 255 integrally formed with or otherwise connected to the electric motor. The portion of the shaft 255 protruding from the protective casing 240 is terminated with a flanged drive pulley 260. An inner portion (not shown) of the flanged drive pulley 260 defines an aperture opening with which the shaft 255 is inserted and may be keyed to prevent the flanged drive pulley 260 from slipping on the shaft 255. A second flanged pulley 270 is mounted to the document bed 205 along the first side 245 of the document scanner 200 positioned oppositely from the flanged drive pulley 260. There are many possible methods with which to mount the second flanged pulley 270 to the document bed 205. For example, a hooked structure (not shown) may be utilized; the hooked structure may have a first end affixed to the underside 255 of the document bed 205 and a second end projecting in a direction generally upwards and normal to the document bed 205. The second end of the hooked structure may then be sized to complement an inner portion of the second flanged pulley 270 defined by a passage 280 such that the second end can be inserted into the passage 280. In this fashion an axis of rotation is defined, thereby allowing the second flanged pulley 270 to spin.

In the example embodiment the flanged drive pulley 260 is coupled to the second flanged pulley 270 via a belt 285. The belt 285 is chosen and/or adjusted accordingly such that tension in the belt 285 develops friction between the belt 285 and respective surfaces of pulleys 260 and 270 such that rotational motion associated with the shaft 255 of the stepper motor 215 is transmitted to the belt 285. In this manner, conversion of rotational motion (of the motor) to a linear motion (of a portion of the belt) is achieved to move the scanning module 210 during the scanning procedure.

In the embodiment shown, the belt and pulley system 212 is mounted to the document scanner 200 such that features included in to the scanning module 210 facilitate a direct link to the belt and pulley system. For example, a slider bar 290 provides a mounting location for the scanning module 210, allowing the scanning module 210 to slide at least along the length of a check placed on the document positioning surface 225 during the scanning procedure.

In the example embodiment, the slider bar 290 is integrally formed with an L-shaped mounting bracket 292 having portions affixed to a first side 293 and a second side 294 of the document bed 205. There are many methods with which to affix the mounting bracket 292 to the document bed 205. For example the mounting bracket 292 may be removably affixed via a screw and nut assembly, however, it will be appreciated that alternate methods may be employed such as welding, or other affixation methods.

The scanning module 210 is coupled to the slider bar 290 via a slider bracket 295 integrally formed with the scanning module 210. The slider bracket 298 includes portions defining a pair of apertures 296 such that the slider bar 290 can be inserted thereto. The scanning module 210 is then coupled to the belt 290 via a tab member 298 formed on the slider bracket 295. It will be appreciated that the tab member 298 may be linked to the belt 285 in a variety of ways. For example, the tab member 298 may include a molded clip mechanism (similar to a clothes pin) to releasably secure the tab member 298 to the belt 285. In alternative embodiments, a clip mechanism may be pinched to permanently secure the tab member 298 to the belt 285. In this manner, the stepper motor 215 is coupled to the scanning module 210 and can generally control the movement of the scanning module 210 in either direction along the document bed 205 and associated document positioning surface 225.

As briefly mentioned, knowledge of the scanner speed profile of the scanning module 210 is required to both properly formulate a scanned image using the CIS module 230 and to adequately read magnetic alphanumeric characters using the MICR module 235. To achieve a consistent speed profile of the scanning module 210, a mechanical linear displacement mechanism, such as the stepper motor 215 of the embodiment shown, actuates the scanning module 210 during the scanning procedure.

Figure 4:
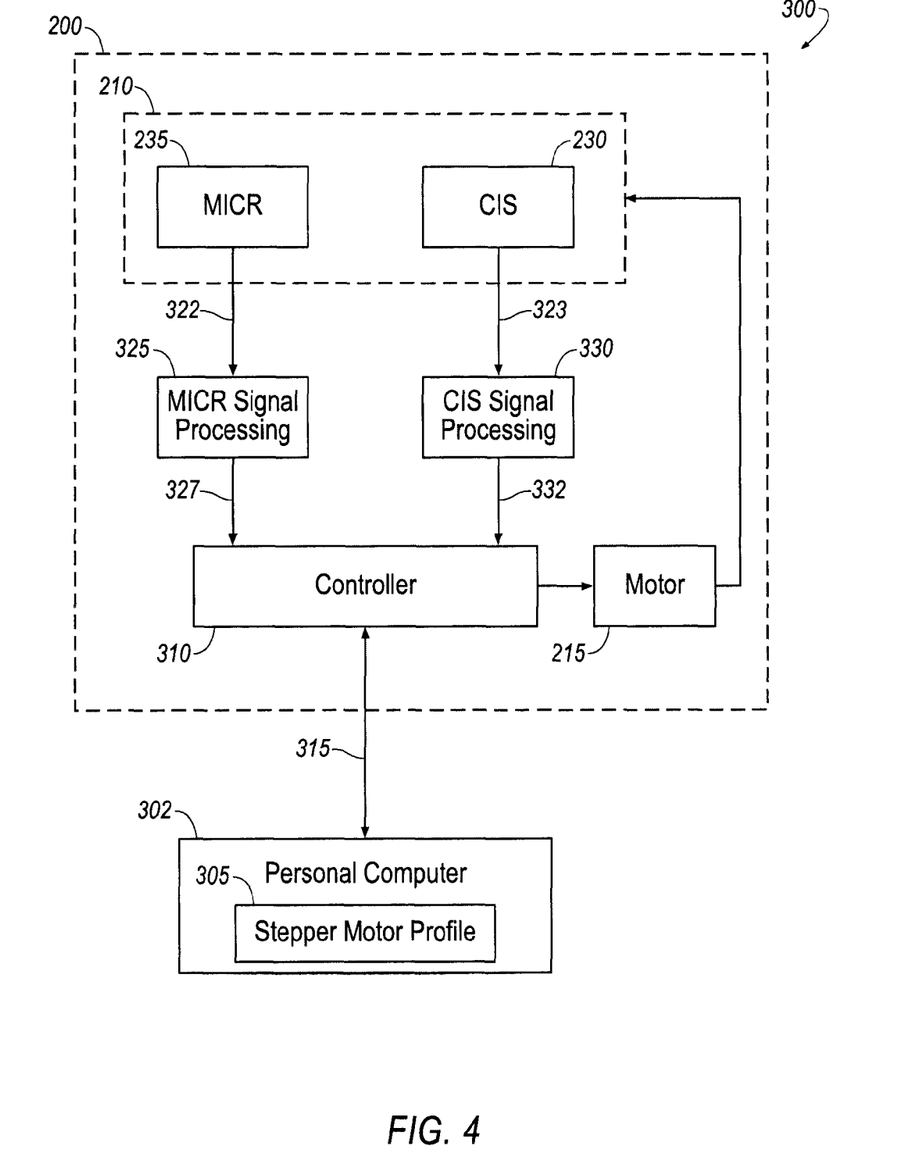
FIG. 4 is a logical block diagram of aspects of a motorized document scanner, according to a possible embodiment of the present disclosure.

Now referring to FIG. 4, an example block diagram of an operational scanning system 300 is shown, according to a possible embodiment of the present disclosure. The scanning system 300 can correspond to logical instructions and actions regarding components of a document scanner, such as the one shown in FIGS. 2-3, above. The scanning system 300 includes a stepper motor profile module 305. In the example embodiment the stepper motor profile module 305 can include one or more programmable parameters to facilitate linear displacement of the scanning module 210 during the scanning procedure. For example, the rate or speed at which the scanning module 210 moves across the document during the scanning procedure can be held approximately constant and within an allowable range, to reliably and efficiently collect document data. In general, the scanning module 210 allowable range is defined by an upper and a lower limit predetermined by the respective imaging capabilities of the MICR module 235 and the CIS module 230, as previously described. Typically, the upper limit is dictated by the fastest rate at which the CIS module 230 can acquire an image and the lower limit is determined by the minimum speed required for the MICR module 235 to sufficiently acquire magnetic character signatures.

In an example embodiment, the stepper motor profile module 305 can reside on personal computer (PC) 302 such that a PC application can be utilized to author, modify and or transfer relevant data to a control module 310 residing on the document scanner 200. The control module 310 can include control logic designed to implement the desired the scanner speed profile of the scanning module during the scanning procedure. However there are many additional scanning procedures related parameters that the stepper motor profile module 305 can include. For example, an arbitrary sequencing of the displacement of the scanning module 210 may be controlled via the control module 310. For example, one or more parameters associated with the stepper motor profile module 305 can be defined such that the scanning module 210 is programmed to start the scanning procedure from either end 293, 294 of the document scanner 200, effectively scanning right to left or left to right, eliminating the need to reset the scanning module 210 after scanning a document. In this manner, the document may be flipped after a front side is initially scanned, and the scanning process can be repeated for back side scanning on the return pass. Other example scanning procedures could be defined as well. For example, in one aspect, the scanning module 210 may be directed to acquire image information while scanning from left to right, and acquire magnetic character information scanning right to left. In another aspect, the scanning module 210 can be programmed to acquire magnetic information in both a left to right and right to left direction as a redundancy measure to ensure that the magnetic characters are interpreted correctly.

In the example embodiment, parameters associated with the stepper motor profile module 305 may be transferred to the controller module 310 via a communication link 315 from a PC application run on the PC 302 (e.g. on a computing system 125 as shown in FIG. 1). The communication link 315 can be implemented via any of a number of standard or specialized communication interfaces, such as a USB, 802.11 a/b/g network, RF, infrared, serial, or any other data connection.

In general, during the scanning procedure the controller module 310 maintains the scanner speed profile within the allowable range via feedback from both the MICR module 235 and the CIS module 230. More specifically, a MICR feedback signal 322 and a CIS feedback signal 323 may be utilized to monitor the status of the MICR module 235 and the CIS module 230 during the scanning procedure. The respective feedback signals 322, 323 may be conditioned by a MICR signal processing module 325 and a CIS signal processing module 330. Subsequently a conditioned MICR feedback signal 327 and a conditioned CIS feedback signal 332 are relayed to the controller module 310 wherein functional logic can be utilized to implement scanning module 210 speed corrections as necessary.

In an example embodiment the respective signal processing modules 325, 330 and the controller module 310 can be integrated onto the document scanner 200. For example, the enclosure 252 integrally formed with the underside 255 of the document scanner 200 as depicted in FIG. 3 can house a printed circuit board (PCB) 254. The PCB 254 can be populated with a hardware implementation of the aforementioned modules. Additionally, the PCB 254 can be populated with discrete passive/active electric components, integrated electronic components, essential memory elements, I/O circuitry, etc., useable for operating the document scanner 200 according to the principles of the present disclosure.

Although the scanning system 300 is discussed in terms of operation using the document scanner of FIG. 2, it is understood that the present disclosure is not so limited. Specifically, the scanning system 300 can be used in conjunction with any of a variety of alternative embodiments of a document scanner, such as are described through this disclosure.

Figure 5:
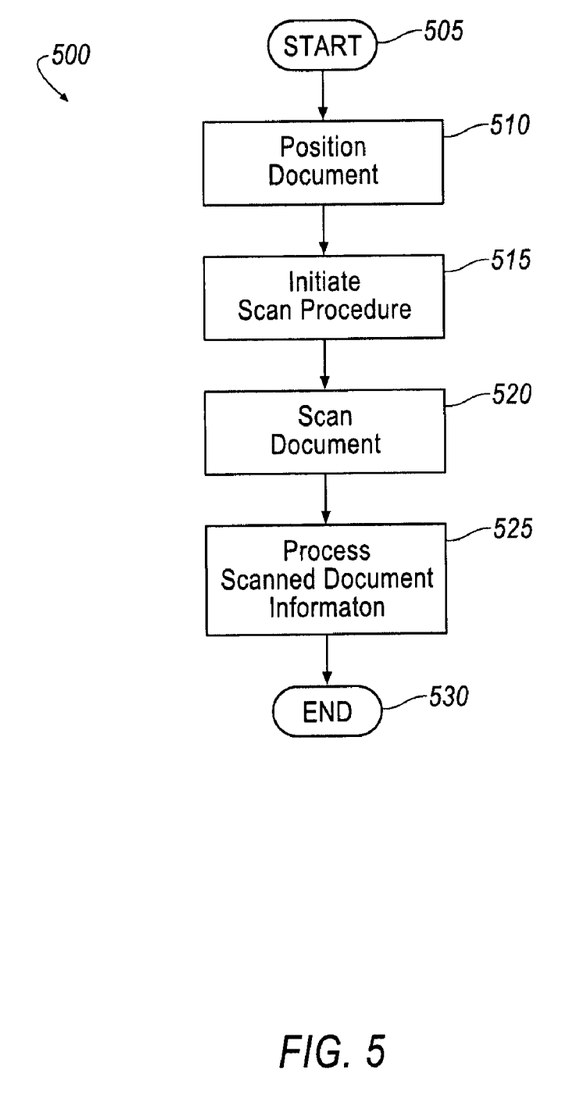
FIG. 5 is a flow diagram of methods and systems to operate a document scanner in accordance with a possible embodiment of the present disclosure.

Referring now to FIG. 5, an example flowchart of methods and systems 500 for operation of the document scanner are discussed according to the possible embodiment of the present disclosure. The various embodiments of the methods and systems described herein are discussed in the context of a document scanner, which, in certain embodiments, can correspond to use or operation of the document scanner 200 of FIGS. 2-4. In other embodiments, different types of document scanners having different arrangements of stepper motors, scanning elements, and other features could be used as well. The methods and systems 500 described herein can correspond to software, or other electrical/electromechanical instructions provided to a document processing system to perform document processing tasks. The methods and systems 500 described herein can, in various embodiments, be executed on a computing system such as that shown in FIG. 6, below, or in circuitry of a document processing system.

Operational flow is instantiated at a start operation 505. Operational flow proceeds to a document placement module 510. In certain embodiments, the document placement module 510 corresponds to an end user, such as an individual at a home office, positioning a document (e.g. a check) onto the document positioning surface of the document bed. In further embodiments, the document placement module 510 can correspond to the document scanner receiving a document placed on the document positioning surface. For example, the document scanner can automatically detect the existence of a document, or could otherwise assist in placing the document on the document positioning surface (for example, by providing alignment using the registration assemblies described above). Other possibilities exist as well.

Operational flow proceeds to scan initiation module 515. The scan initiation module 515 corresponds to the initiation of a scanning procedure where a programmable stepper motor profile is loaded onto a controller module, as described in conjunction with FIG. 4 above. In general, one or more parameters associated with the stepper motor profile define the manner that the scanning module moves across the document during the scanning procedure. The scan initiation module 515 can also correspond, in certain embodiments, to a user activating a stepper motor to initiate the scanning process.

Operational flow proceeds to a scan module 520, which, in the various embodiments disclosed herein, corresponds to capture of information printed on a document using the document scanner. The scan module 520 generally corresponds to activation and movement of a scanning module over a document placed in a scanning location of a document scanner, to allow the various information capture devices (e.g. a contact image sensor, magnetic ink character reader, or other elements) to capture information printed on the document. In one embodiment, a stepper motor is directly linked to the scanning module so that the stepper motor may actuate the scanning module across the document positioned on a document surface, and the document is scanned according to parameters as defined in the stepper motor profile. In the case of a check, for example, the stepper motor profile can be configured to allow image and character information to captured (e.g. check routing information, payor and payee information, check amount, date, signature image, etc.).

Operational flow proceeds to a processing module 525, which corresponds to use and/or storage of information captured by the document scanner. The processing module 525 can, in various embodiments, incorporate a variety of storage and usage operations. For example, the captured image and/or character data can be stored in a memory element of the document scanner (such as in a memory integrated onto a printed circuit board) or a computing system interconnected to the document scanner, or communicated across a network as illustrated in FIG. 1, wherein the data is sent to a remote location (e.g. a financial institution) for processing, reducing the time required for notifying a financial institution of the document information by bypassing the requirement of physical transport of the document. Operational flow terminates at an end operation 530, which corresponds with completed information capture from a document.

Figure 6:
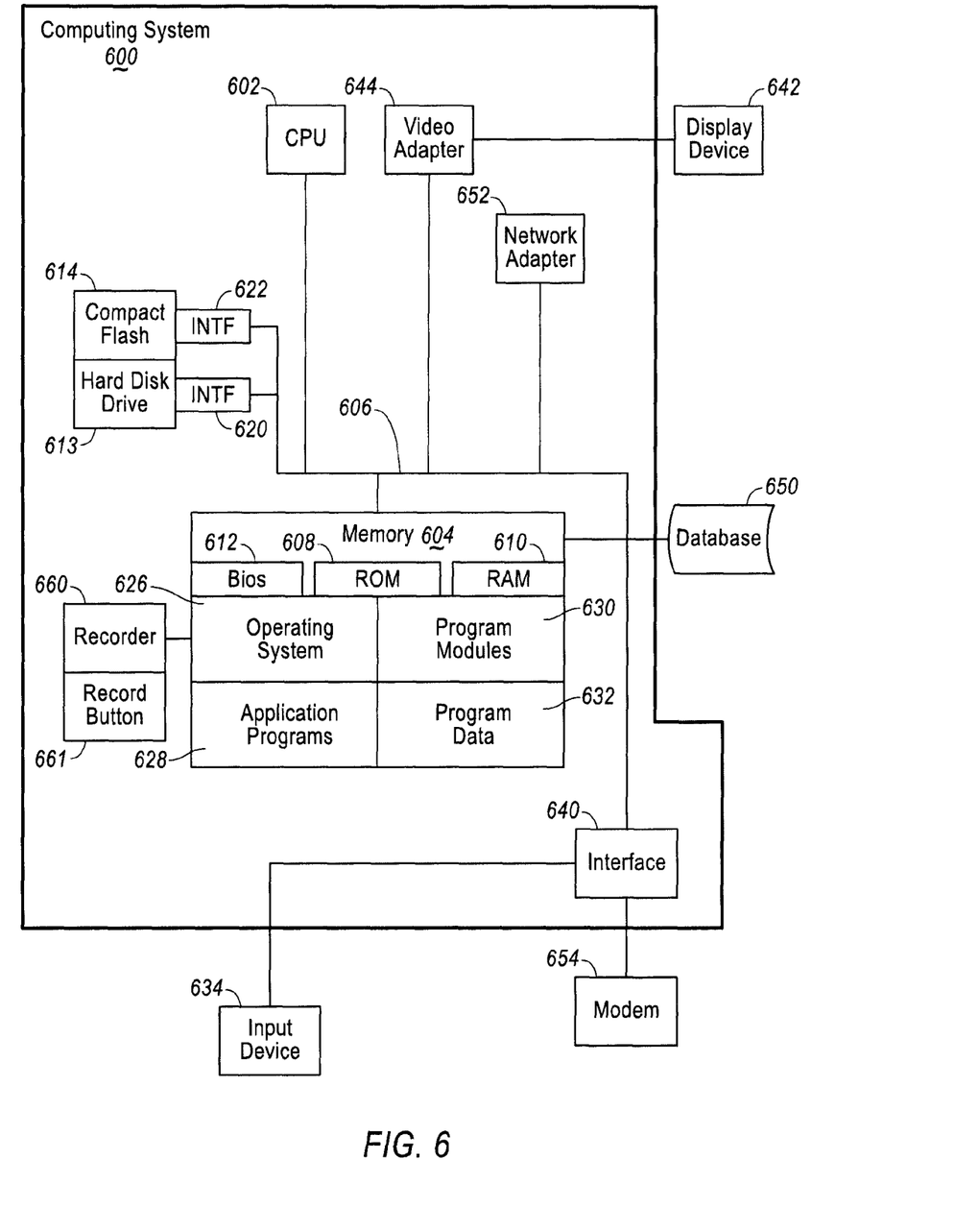
FIG. 6 illustrates a general purpose computing system for use in implementing one or more computing embodiments of the present disclosure.

Referring to FIG. 6, an exemplary environment for implementing embodiments of the present disclosure includes a general purpose computing device in the form of a computing system 600, including at least one processing system 602. In the various embodiments described herein, the general purpose computing device can correspond to the various computing devices of FIG. 1, such as that located at the transaction location 12. The computing system 600 can provide functionality for performing aspects of the present disclosure reflected in the systems and methods disclosed in FIG. 5, and can be used in conjunction with the document scanner of FIGS. 2-4. A variety of processing units 602 are available from a variety of manufacturers, for example, Intel or Advanced Micro Devices. The computing system 600 also includes a system memory 604, and a system bus 606 that couples various system components including the system memory 604 to the processing unit 602. The system bus 606 might be any of several types of bus structures including a memory bus, or memory controller; a peripheral bus; and a local bus using any of a variety of bus architectures.

Preferably, the system memory 604 includes read only memory (ROM) 608 and random access memory (RAM) 610. A basic input/output system 612 (BIOS), containing the basic routines that help transfer information between elements within the computing system 600, such as during start up, is typically stored in the ROM 608.

Preferably, the computing system 600 further includes a secondary storage device 613, such as a hard disk drive, for reading from and writing to a hard disk (not shown), and/or a compact flash card 614.

The hard disk drive 613 and compact flash card 614 are connected to the system bus 606 by a hard disk drive interface 620 and a compact flash card interface 622, respectively. The drives and cards and their associated computer readable media provide nonvolatile storage of computer readable instructions, data structures, program modules and other data for the computing system 600.

Although the exemplary environment described herein employs a hard disk drive 613 and a compact flash card 614, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk drive 613, compact flash card 614, ROM 608, or RAM 610, including an operating system 626, one or more application programs 628, other program modules 630, and program data 632. A user may enter commands and information into the computing system 600 through an input device 634. Examples of input devices might include a keyboard, mouse, microphone, joystick, game pad, satellite dish, scanner, digital camera, touch screen, and a telephone. These and other input devices are often connected to the processing unit 602 through an interface 640 that is coupled to the system bus 606. These input devices also might be connected by any number of interfaces, such as a parallel port, serial port, game port, or a universal serial bus (USB). A display device 642, such as a monitor or touch screen LCD panel, is also connected to the system bus 606 via an interface, such as a video adapter 644. The display device 642 might be internal or external. In addition to the display device 642, computing systems, in general, typically include other peripheral devices (not shown), such as speakers, printers, and palm devices. The computing system 600 can also interface with an external database 650, such as a data store resident on a separate computer or peripheral device.

When used in a LAN networking environment, the computing system 600 is connected to the local network through a network interface or adapter 652. When used in a WAN networking environment, such as the Internet, the computing system 600 typically includes a modem 654 or other means, such as a direct connection, for establishing communications over the wide area network. The modem 654, which can be internal or external, is connected to the system bus 606 via the interface 640. In a networked environment, program modules depicted relative to the computing system 600, or portions thereof, may be stored in a remote memory storage device. It will be appreciated that the network connections shown are exemplary and other means of establishing a communications link between the computing systems may be used.

The computing system 600 might also include a recorder 660 connected to the system memory 604. The recorder 660 includes a microphone for receiving sound input and is in communication with the system memory 604 for buffering and storing the sound input. Preferably, the recorder 660 also includes a record button 661 for activating the microphone and communicating the sound input to the system memory 604.

A computing device, such as computing system 600, typically includes at least some form of computer-readable media. Computer readable media can be any available media that can be accessed by the computing system 600. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 600.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Referring now to FIGS. 1-6 generally, use of a low-cost, portable document scanning system including a motorized scanning module provides improved reliability for capturing relevant document information by scanning a document at an optimum scanning rate during the scanning procedure. Additionally, a reduced risk benefit may be realized as fundamental logistical issues such as check jamming or induced check damage common to distributed capture systems can be approximately eliminated. Further, the document scanning system of the present disclosure offers a viable document scanning solution for small scale end users who require low-cost portable document scanning technologies.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An apparatus, comprising:
a workpiece bed having a workpiece positioning surface;
a scanning module slidably-coupled to the workpiece bed by a support assembly to permit movement of the scanning module across the workpiece positioning surface, wherein the scanning module includes
at least one workpiece information obtaining module that obtains information pertaining to a workpiece disposed upon the workpiece positioning surface, wherein the workpiece is composed of a financial document, wherein the at least one workpiece information obtaining module is composed of
a contact image sensor module that generates an image of the financial document, and
a magnetic ink character recognition module that generates a signal by magnetically reading a plurality of characters printed upon the financial document in magnetic ink; and
a linear displacement mechanism connected to the scanning module by way of the support assembly, wherein the linear displacement mechanism drives sliding movement of the scanning module relative the workpiece positioning surface at a driven speed within a speed range, wherein the speed range is bound by an upper speed limit and a lower speed limit, wherein the driven speed being:
a) higher than the upper speed limit of the speed range results in:
an unusable image generated by the contact image sensor,
b) lower than the lower speed limit of the speed range results in:
an unusable signal generated by the magnetic ink character recognition module, and
c) within the speed range results in both of:
a usable image generated by the contact image sensor, and
a usable signal generated by the magnetic ink character recognition module.

2. The apparatus according to claim 1, wherein the support assembly includes
a first sub-assembly including:
a first mounting bracket connected proximate to a first end of the workpiece bed,
a second mounting bracket connected proximate to a second end of the workpiece bed, and
a bar having a first end and a second end, wherein the first end of the bar is supportably-connected to the first mounting bracket, wherein the second end of the bar is supportably-connected to the second mounting bracket.

3. The apparatus according to claim 2, wherein the support assembly further includes
a second sub-assembly including:
a first flanged pulley connected proximate to the first end of the workpiece bed,
a second flanged pulley connected proximate to the second end of the workpiece bed, and
a belt connecting the first flanged pulley to the second flanged pulley.

4. The apparatus according to claim 3, wherein the support assembly further includes
a third sub-assembly that connects the first sub-assembly to the second sub-assembly, wherein the third sub-assembly includes:
a slider bracket extending from the scanning module, wherein the slider bracket includes a first aperture and a second aperture, wherein the bar extends through the first aperture and the second aperture for slidably-coupling the slider bracket to the bar, and
a tab member extending from the slider bracket, wherein the tab member is connected to the belt.

5. The apparatus according to claim 4, wherein the linear displacement mechanism is connected to one of the first flanged pulley and the second flanged pulley for rotating one of the first flanged pulley and the second flanged pulley in one of a clockwise direction and a counter-clockwise direction for causing movement of the belt in one of a forward direction and a reverse direction that results in one of a forward movement and a rearward movement of all of: the tab member, the slider bracket and the scanning module.

6. The apparatus according to claim 1 further comprising:
a plurality of workpiece registration portions extending away from the workpiece positioning surface, wherein the plurality of workpiece registration portions include at least:
a first row of registration portions, and
a second row of registration portions that is arranged substantially perpendicular with respect to the first row of registration portions.

7. The apparatus according to claim 1 further comprising an enclosure connected to an underside of the workpiece bed, and
a printed circuit board supported by the enclosure, wherein the circuit board includes hardware that maintains the driven speed of the scanning module within the speed range.

8. The apparatus according to claim 7, wherein the hardware includes
a MICR signal processing module that is communicatively-coupled to the magnetic ink character recognition module,
a CIS signal processing module that is communicatively-coupled to the contact image sensor module, and
a control module that is communicatively-coupled to both of the MICR signal processing module and the CIS signal processing module, wherein the control module is communicatively-coupled to the linear displacement mechanism, wherein the control module contains control logic and programmed data parameters related to the speed range.

9. The apparatus according to claim 8, wherein the driven speed of the scanning module results in the MICR signal processing module receiving a MICR feedback signal from the magnetic ink character recognition module, wherein the driven speed of the scanning module results in the CIS signal processing module receiving a CIS feedback signal from the contact image sensor module, wherein the control module receives a conditioned MICR feedback signal from the MICR signal processing module and a conditioned CIS feedback signal from the CIS signal processing module, wherein the control logic of the control module outputs a speed adjustment feedback signal to the linear displacement mechanism for maintaining the driven speed of the scanning module within the speed range.

10. A method, comprising:
arranging a workpiece composed of a financial document upon a workpiece positioning surface of a workpiece bed;
moveably-arranging a scanning module upon a support assembly that is connected to the workpiece bed; and
utilizing a linear displacement mechanism for driving the scanning module relative to: the support assembly, the workpiece bed and the financial document, wherein, during the driving the scanning module step:
utilizing a contact image sensor module arranged within the scanning module for generating an image of the financial document, and
utilizing a magnetic ink character recognition module arranged within the scanning module for
generating a signal by magnetically reading a plurality of characters printed upon the financial document in magnetic ink,
wherein the utilizing the linear displacement step further comprises the step of
driving the scanning module at a driven speed within a speed range, wherein the speed range is bound by an upper speed limit and a lower speed limit, wherein, if the driven speed is:
a) higher than the upper speed limit of the speed range, the contact image sensor module generates:
an unusable image,
b) lower than the lower speed limit of the speed range, the magnetic ink character recognition module generates:
an unusable signal, and
c) within the speed range:
the contact image sensor module generates a usable image, and
the magnetic ink character recognition module generates a usable signal.

11. The method according to claim 10 further comprising the step of
arranging the support assembly to include:
a first sub-assembly including: a first mounting bracket connected proximate to a first end of the workpiece bed, a second mounting bracket connected proximate to a second end of the workpiece bed, and a bar having a first end and a second end, wherein the first end of the bar is supportably-connected to the first mounting bracket, wherein the second end of the bar is supportably-connected to the second mounting bracket;
a second sub-assembly including: a first flanged pulley connected proximate to the first end of the workpiece bed, a second flanged pulley connected proximate to the second end of the workpiece bed, a belt connecting the first flanged pulley to the second flanged pulley; and
a third sub-assembly that connects the first sub-assembly to the second sub-assembly, wherein the third sub-assembly includes: a slider bracket extending from the scanning module, wherein the slider bracket includes a first aperture and a second aperture, wherein the bar extends through the first aperture and the second aperture for slidably-coupling the slider bracket to the bar, a tab member extending from the slider bracket, wherein the tab member is connected to the belt, wherein the linear displacement mechanism is connected to one of the first flanged pulley and the second flanged pulley.

12. The method according to claim 11 further comprising the step of
utilizing the linear displacement mechanism for
rotating one of the first flanged pulley and the second flanged pulley in one of a clockwise direction and a counter-clockwise direction for
causing movement of the belt in one of a forward direction and a reverse direction for
causing one of a forward movement and a rearward movement of all of: the tab member, the slider bracket and the scanning module.

13. The method according to claim 10 further comprising the step of:
arranging a plurality of workpiece registration portions that extend away from the workpiece positioning surface, wherein the plurality of workpiece registration portions are arranged to include at least: a first row of registration portions and a second row of registration portions, wherein the second row of registration portions are arranged substantially perpendicularly with respect to the first row of registration portions.

14. The method according to claim 10 further comprising the step of:
- connecting an enclosure to an underside of the workpiece bed, and
- supportably-connecting a printed circuit board to the enclosure, wherein the circuit board includes hardware for
  - maintaining the driven speed of the scanning module within the speed range.

15. The method according to claim 14, wherein the hardware includes: a MICR signal processing module, a CIS signal processing module and a control module, wherein the method further comprises the steps of
- communicatively-coupling the MICR signal processing module to the magnetic ink character recognition module,
- communicatively-coupling the CIS signal processing module to the contact image sensor module,
- communicatively-coupling the control module to both of the MICR signal processing module and the CIS signal processing module, and
- communicatively-coupling the control module to the linear displacement mechanism, wherein the control module contains control logic and programmed data parameters related to the speed range.

16. The method according to claim 15, wherein, responsive to the driven speed of the scanning module, further comprising the steps of:
- the MICR signal processing module receiving a MICR feedback signal from the magnetic ink character recognition module; and
- the CIS signal processing module receiving a CIS feedback signal from the contact image sensor module;
- the control module receiving
  - a conditioned MICR feedback signal from the MICR signal processing module, and
  - a conditioned CIS feedback signal from the CIS signal processing module that results in the control logic of the control module
    - sending a speed adjustment feedback signal to the linear displacement mechanism for
      - maintaining the driven speed of the scanning module within the speed range.

* * * * *